United States Patent
Arihara et al.

(10) Patent No.: US 8,431,006 B2
(45) Date of Patent: Apr. 30, 2013

(54) METHOD AND APPARATUS FOR PRODUCING OZONE-WATER

(75) Inventors: Kazuki Arihara, Yokosuka (JP); Akira Fujishima, Kawasaki (JP)

(73) Assignee: Central Japan Railway Company, Nagoya-Shi (JP)

( * ) Notice: Subject to any disclaimer, the term of this patent is extended or adjusted under 35 U.S.C. 154(b) by 1403 days.

(21) Appl. No.: 11/989,770

(22) PCT Filed: May 2, 2006

(86) PCT No.: PCT/JP2006/309157
§ 371 (c)(1),
(2), (4) Date: Jan. 31, 2008

(87) PCT Pub. No.: WO2007/017976
PCT Pub. Date: Feb. 15, 2007

(65) Prior Publication Data
US 2010/0089765 A1  Apr. 15, 2010

(30) Foreign Application Priority Data

Aug. 10, 2005  (JP) ................. 2005-232184

(51) Int. Cl.
| | |
|---|---|
| *C25C 1/00* | (2006.01) |
| *C25D 17/00* | (2006.01) |
| *C25B 11/00* | (2006.01) |
| *C25B 15/00* | (2006.01) |
| *C25B 9/00* | (2006.01) |
| *C25C 7/00* | (2006.01) |

(52) U.S. Cl.
USPC ............ 205/626; 204/242; 204/241; 204/284

(58) Field of Classification Search ............... None
See application file for complete search history.

(56) References Cited

U.S. PATENT DOCUMENTS

| | | | | |
|---|---|---|---|---|
| 4,629,373 | A * | 12/1986 | Hall ............................ | 407/118 |
| 5,599,438 | A * | 2/1997 | Shiramizu et al. ............ | 205/746 |
| 5,900,127 | A * | 5/1999 | Iida et al. ................. | 204/290.08 |
| 6,217,725 | B1 * | 4/2001 | Van Anglen et al. ......... | 204/207 |
| 6,376,118 | B1 * | 4/2002 | Bruck et al. .................. | 429/480 |

(Continued)

FOREIGN PATENT DOCUMENTS

| | | |
|---|---|---|
| EP | 1741676 A2 | 1/2007 |
| EP | 1754804 | 2/2007 |

(Continued)

OTHER PUBLICATIONS

"New Edition of New Technology for Utilizing Ozone," Sanyu Shobo, Feb. 1993, pp. 74, 76, 78, 426, 428, 430, 432.

(Continued)

*Primary Examiner* — In Suk Bullock
*Assistant Examiner* — Jennifer Wecker
(74) *Attorney, Agent, or Firm* — Edwards Wildman Palmer LLP; James E. Armstrong, IV; Nicholas J. DiCeglie, Jr.

(57) ABSTRACT

A method for producing ozone-water includes steps of providing a cathode and an anode so as to interpose a solid polymer film therebetween, and electrolyzing water. A conductive diamond having one of a porous structure and a mesh structure is used as the anode. Ozone-water of an intermediate to high temperature is produced by electrolyzing water of an intermediate to high temperature.

16 Claims, 7 Drawing Sheets

U.S. PATENT DOCUMENTS

| | | | |
|---|---|---|---|
| 6,398,928 B1 * | 6/2002 | Koganezawa et al. | 204/262 |
| 6,547,947 B1 | 4/2003 | Uno et al. | |
| 6,802,954 B1 * | 10/2004 | Hemphill et al. | 205/640 |
| 2002/0031913 A1 * | 3/2002 | Nishibayashi et al. | 438/689 |
| 2004/0011643 A1 * | 1/2004 | Davies et al. | 204/294 |
| 2005/0110024 A1 | 5/2005 | Swain et al. | |
| 2006/0261349 A1 * | 11/2006 | Doering et al. | 257/77 |

FOREIGN PATENT DOCUMENTS

| | | | |
|---|---|---|---|
| JP | 09-268395 | | 10/1997 |
| JP | 2000-254650 | | 9/2000 |
| JP | 2001223204 A | * | 8/2001 |
| JP | 2003-211104 | | 7/2003 |
| JP | 2004-060011 | | 2/2004 |
| JP | 2004-132592 | | 4/2004 |
| JP | 2004-202283 | | 7/2004 |
| JP | 2005-046730 | | 2/2005 |
| JP | 2005-116466 | | 4/2005 |
| JP | 2005-246279 | | 9/2005 |
| JP | 2005-336607 | | 12/2005 |
| WO | WO-2005/106079 A1 | | 11/2005 |

OTHER PUBLICATIONS

Sugimitsu, Hidetoshi, "Basics and Applications of Ozone," Korin, Feb. 1996, pp. 108-129 with a cover page.
Japanese Office Action issued in JP 2005-232184 on Oct. 6, 2011.
Extended European Search Report issued in European Patent Application No. 06746007.1, dated Jul. 20, 2012.

* cited by examiner

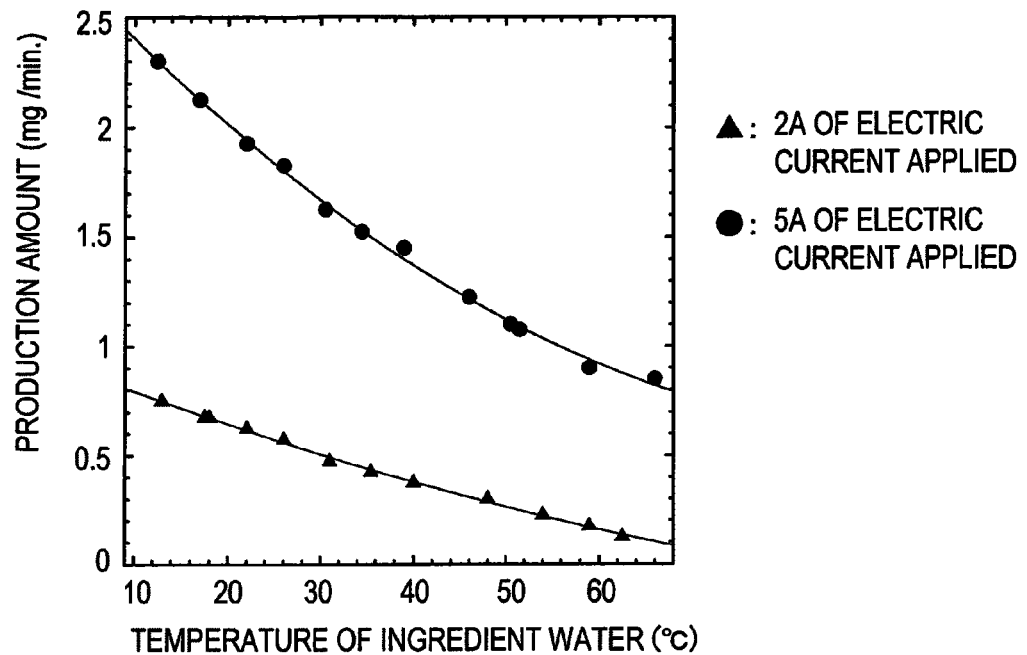
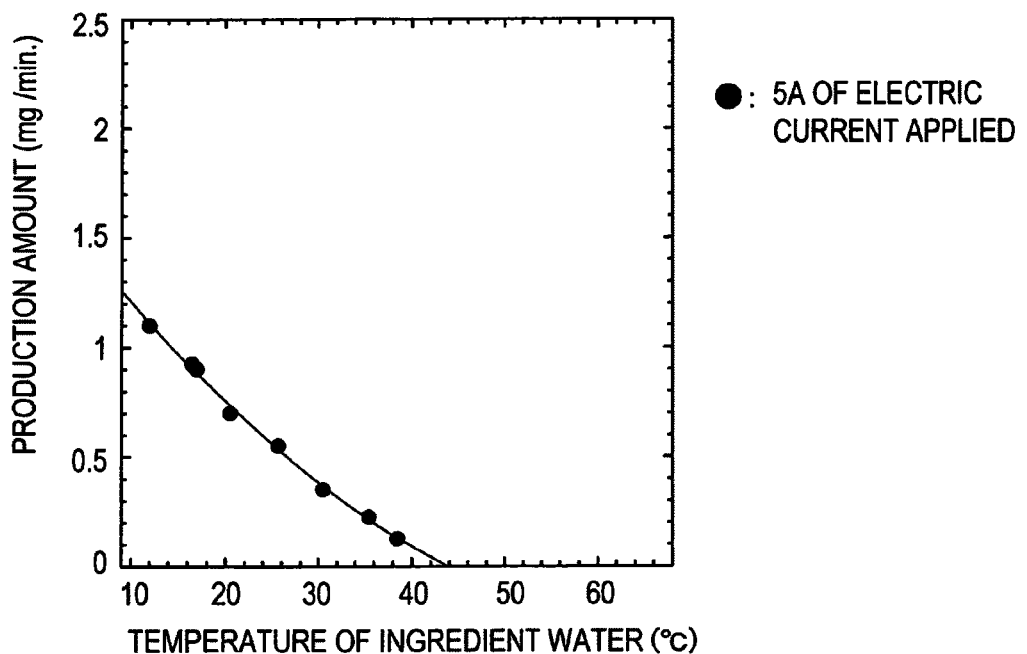

Fig. 5
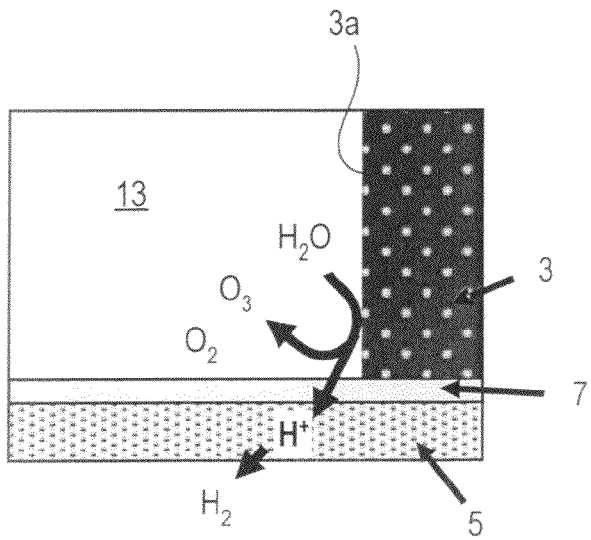
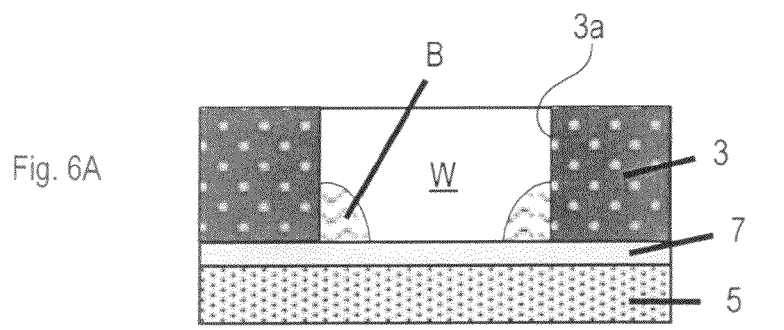
Fig. 6A
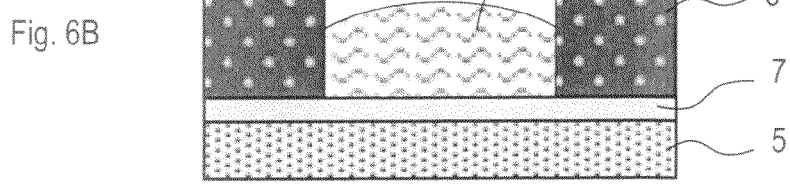
Fig. 6B
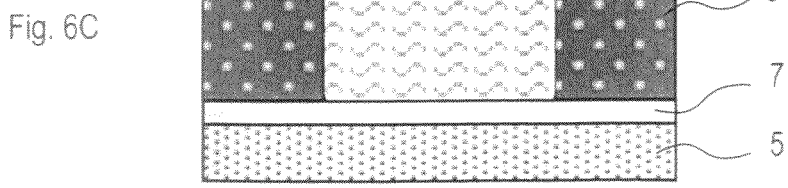
Fig. 6C

METHOD AND APPARATUS FOR PRODUCING OZONE-WATER

TECHNICAL FIELD

The present invention relates to a method and an apparatus for producing ozone-water. Particularly, the present invention relates to a method and an apparatus for producing ozone-water, wherein a cathode and an anode are provided so as to interpose a solid polymer film, and to produce ozone-water by electrolyzing water.

BACKGROUND ART

Ozone is a very strong oxidant and is used in various fields such as for disinfection, sterilization, discoloration, deodorization, oxidative decomposition, oxidative treatment, and so on. Since ozone can be readily decomposed into oxygen spontaneously, the treatment method of utilizing ozone can be a method with non cross contamination. Ozone-water, wherein ozone is dissolved, is safer and easier to be handled as compared to ozone gas. When ozone coexists with moisture or is dissolved in water, the oxidizing ability of ozone is further improved, and generally used for disinfection, cleaning, and so on (see, for example, Non-patent Document 1). For these purposes, developing a method for producing ozone-water, which can more easily, more conveniently, and more efficiently produce ozone-water, has been in demand.

For a method to produce gaseous ozone, a UV lamp method, a silent discharge method, and an electrolysis method are known (see, for example, Non-patent Document 2). The UV lamp method, wherein a small amount of ozone is produced, is usually used for removing a small amount of odor, such as for deodorizing a room or a car. The silent discharge method is a general method for producing ozone gas. However, when atmospheric air is used as the ingredient, nitrogen oxide is simultaneously produced. In order to prevent this, oxygen gas should be used as the ingredient, or an attachment device, which concentrates only oxygen contained in atmospheric air, should be equipped. Moreover, impurity incorporation also becomes a problem wherein metal impurity gets mixed in ozone gas due to a metal electrode being worn away. In contrast, ozone gas can be obtained by water electrolysis. According to the electrolysis method, ozone gas with high purity and high concentration can be easily obtained, even though the obtained ozone gas contains moisture to some extent.

For a method to obtain ozone-water, some methods are known wherein ozone gas, obtained by the above-described methods, is dissolved in water, or wherein ozone-water is produced directly by the electrolysis method. Ozone-water could be obtained by running ozone gas, produced according to the silent discharge method or the electrolysis method, through a vapor-liquid dissolution tower and dissolving the ozone gas in water. However, this kind of method would make a device larger and more complicated. On the other hand, according to the electrolysis method, wherein an electrolysis cell is constituted with a porous or a mesh anode and a porous or a mesh cathode interposing a solid polymer film therebetween and the electrolysis cell is used so as to electrolyze tap water or purified water, ozone-water can be directly produced. Moreover, a device for this kind of method can be easily made into a small size.

The materials used for an electrode for producing ozone-water by the electrolysis method, are generally platinum, gold, platinum-coated titanium, lead oxide, and so on, because of their prominent catalytic functions. These materials are formed into a porous or a mesh structure to be used as an anode 3. The anode 3 and a suitable cathode 5 interpose a solid polymer film 7 therebetween, which, as a result, constitute an electrolysis cell 1, shown, for example, in FIG. 12. Ozone-water can be obtained by water electrolysis while supplying purified water or tap water in an anode chamber 13 of the electrolysis cell 1. In case of producing ozone-water by the electrolysis method as described above, producing ozone-water of an intermediate to high temperature by using warm water at, for example, 42° C. as ingredient water is proposed (see, for example, Patent Document 1). The obtained ozone-water can be used through a shower and the like for disinfecting an entire body.

However, in a case, such as in Patent Document 1, wherein platinum is used as the electrode, a problem has been pointed out in which the electrode gets worn away and dissolved as the electrode is used in electrolysis for producing ozone-water. Even with a platinum electrode, which is considered to have a relatively better durability, or even with the electrode described above, the phenomenon wherein the metal constituting the anode is dissolved as ions is caused, as the electrode is used under the condition for producing ozone in which a large electric current and a large voltage are applied. Since the dissolved metal ions adhere to the solid polymer film and disturb the reaction, the efficiency in ozone production gradually decreases. The inventors of the present invention conducted a comparative test in which warm ozone-water was produced by using a platinum electrode. The result shows that platinum was severely worn away particularly when ozone production was continuously performed in a high-temperature range. Therefore, even by using the above-described apparatus, obtaining warm ozone-water continuously in a long term is considered difficult.

In order to reduce the wearying caused by electrolysis as much as possible, ozone-water of an intermediate to high temperature can be produced in such a way that low-temperature water whose temperature is in the range up to 10° C. is supplied so as to produce ozone-water of a low temperature, and the produced ozone-water is heated so as to be, for example, 25-70° C. However, as known that the solubility of gas decreases as water temperature becomes higher, there is a risk in that ozone gas dissolved in water at a low temperature becomes excessive when water is heated to an intermediate to high temperature, and is released as ozone gas. In a case wherein ozone-water is heated after being produced, the efficiency in producing ozone-water is low, since some of the produced ozone is to be wasted by such release. Therefore, in order to efficiently produce ozone-water of an intermediate to high temperature, the temperature of water to be supplied is preferably maintained in an intermediate to high temperature range when the water is fed to an electrolysis cell.

Recently, a diamond film with electric conductivity is suggested as a material for an electrode in places of platinum and the like. The principal characteristics of the conductive diamond film include unique characteristics which cannot be seen in other materials for an electrode: for example, the conductive diamond film has high mechanical strength and high chemical inertness; molecules are not easily adsorbed to the diamond film; the diamond film exhibits a wide potential window in which oxidative decomposition and reductive decomposition of solvent do not easily occur; there is selectivity of the reaction, and so on. Therefore, producing ozone by using a diamond film has been considered (see, for example, Patent Document 2). In such apparatus, the diamond film is formed on a mesh or a porous substrate by a Hot Filament Chemical Vapor Deposition (CVD) or a microwave plasma assisted CVD, and such substrate having the diamond film formed thereon is used as an anode in an electrolysis cell formed in a configuration wherein a solid polymer film is interposed by electrodes.

Non-Patent Document 1: (February 1993). New Edition of New Technology for Utilizing Ozone: Sanyu Shobo Non-Patent Document 2: Sugimitsu, Hidetoshi (February 1996). Basics and Applications of Ozone: Korin Patent Document 1: Unexamined Japanese Patent Publication No. 2004-60011

Patent Document 2: Unexamined Japanese Patent Publication No. 9-268395

DISCLOSURE OF THE INVENTION

Problems to be Solved by the Invention

Consideration has not been made with regard to using an electrolysis cell, in which a conductive diamond is used as an electrode material, in order to produce ozone-water of an intermediate to high temperature. In this regard, the inventors of the present invention have found out, while carrying out a primary study for using such electrolysis cell, that the ozone production capability of a diamond electrode is approximately twice as superior as the capability of platinum, and that reduction in the ozone production capability is small even in a high temperature range. Therefore, the present invention is made so as to provide a method and an apparatus for producing ozone-water in which ozone-water of an intermediate to high temperature can be efficiently and stably produced by using a conductive diamond as an electrode material.

Means for Solving the Problems

A method for producing ozone-water according to the present invention which is made so as to achieve the above-described objects includes steps of: providing a cathode and an anode so as to interpose a solid polymer film therebetween; and electrolyzing water. A conductive diamond having one of a porous structure and a mesh structure is used as the anode. Ozone-water of an intermediate to high temperature is produced by electrolyzing water of an intermediate to high temperature.

In the present invention constituted as above, ozone-water of an intermediate to high temperature is produced by disposing the cathode and the anode so as to interpose the solid polymer film therebetween, and electrolyzing water of an intermediate to high temperature. Therefore, ozone-water of an intermediate to high temperature can be produced by the above-described electrolysis in an anode side, and the production thereof is easy and convenient. Moreover, since a conductive diamond having one of a porous structure and a mesh structure is used as the anode in the present invention, even if water temperature is an intermediate to high temperature, such as at 25-70° C., ozone-water of an intermediate to high temperature at 25-70° C. can be efficiently and stably produced.

As the above-described anode, various types of conductive diamonds may be employed. If a free-standing conductive diamond is used as the above-described anode, the following effect can be additionally achieved. That is, such free-standing conductive diamond is dissimilar from a substrate, made of silicon, titanium, niobium, graphite and so on and having a diamond film formed thereon, and is not to be concerned about the diamond film being exfoliated from the substrate even after an electrolysis treatment is performed in which a high voltage and a high electric current are applied. Therefore, if a free-standing conductive diamond having one of a porous structure or a mesh structure is used as the anode as described above, ozone-water of an intermediate to high temperature can be even more stably and even more efficiently produced.

An apparatus for producing ozone-water by electrolyzing water according to the present invention includes an electrolysis cell having a cathode, an anode, and a solid polymer film interposed between the cathode and the anode. The apparatus further includes a heater that heats water to be supplied at least toward the anode side of the electrolysis cell to an intermediate to high temperature. A conductive diamond having one of a porous structure or a mesh structure is used as the anode.

In the present invention configured as above, water heated by the heater up to an intermediate to high temperature, for example between 25-70° C., is supplied at least toward the anode side of the electrolysis cell wherein the cathode and the anode are disposed so as to interpose the solid polymer film. Therefore, ozone-water of an intermediate to high temperature can be produced in the anode side by electrolysis, performed by the above-described electrolysis cell, and the production of such ozone-water is easy and convenient. Moreover, since a conductive diamond having one of a porous structure and a mesh structure is used as the anode in the present invention, even if water temperature is an intermediate to high temperature as described above, ozone-water of an intermediate to high temperature can be efficiently and stably produced.

As the above-described anode, various types of conductive diamonds may be employed. If a free-standing conductive diamond is used as the above-described anode, the following effect can be additionally achieved. That is, such free-standing conductive diamond is dissimilar from a substrate, made of silicon, titanium, niobium, graphite and so on and having a diamond film formed thereon, and is not to be concerned about the diamond film being exfoliated from the substrate even after an electrolysis treatment is performed in which a high voltage and a high electric current are applied. Therefore, if a free-standing conductive diamond having one of a porous structure or a mesh structure is used as the anode as described above, ozone-water of an intermediate to high temperature can be even more stably and even more efficiently produced.

BRIEF DESCRIPTION OF THE DRAWINGS

FIGS. 3A, 3B are graphs showing, in comparison with a comparative example, a dependency indicating that an amount of ozone produced by the above-described apparatus for producing ozone-water depends on water temperature when tap water is used as ingredient water;

FIG. 5 is an explanatory view showing that a reaction at the anode takes place in the vicinity of a three-phase interface;

FIG. 6A-6C are explanatory views showing growth of an air bubble in a hole of the anode;

EXPLANATION OF REFERENTIAL NUMERALS

Figure 1:
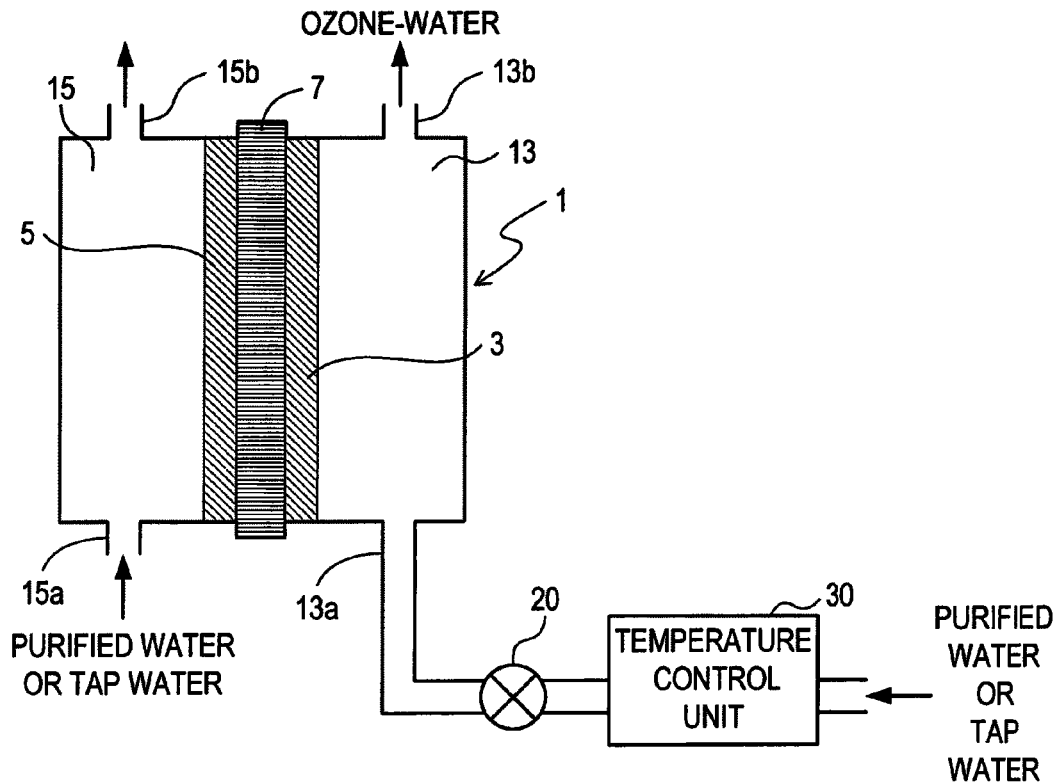
FIG. 1 is a diagram showing the structure of an apparatus for producing ozone-water to which the present invention is applied.

1 ... electrolysis cell 3 ... anode 3a ... hole 5 ... cathode 7 ... solid polymer film 13 ... anode chamber 15 ... cathode chamber 20 ... electromagnetic valve 30 ... temperature control unit

DETAILED DESCRIPTION OF PREFERRED EMBODIMENT OF THE INVENTION

Figure 12:
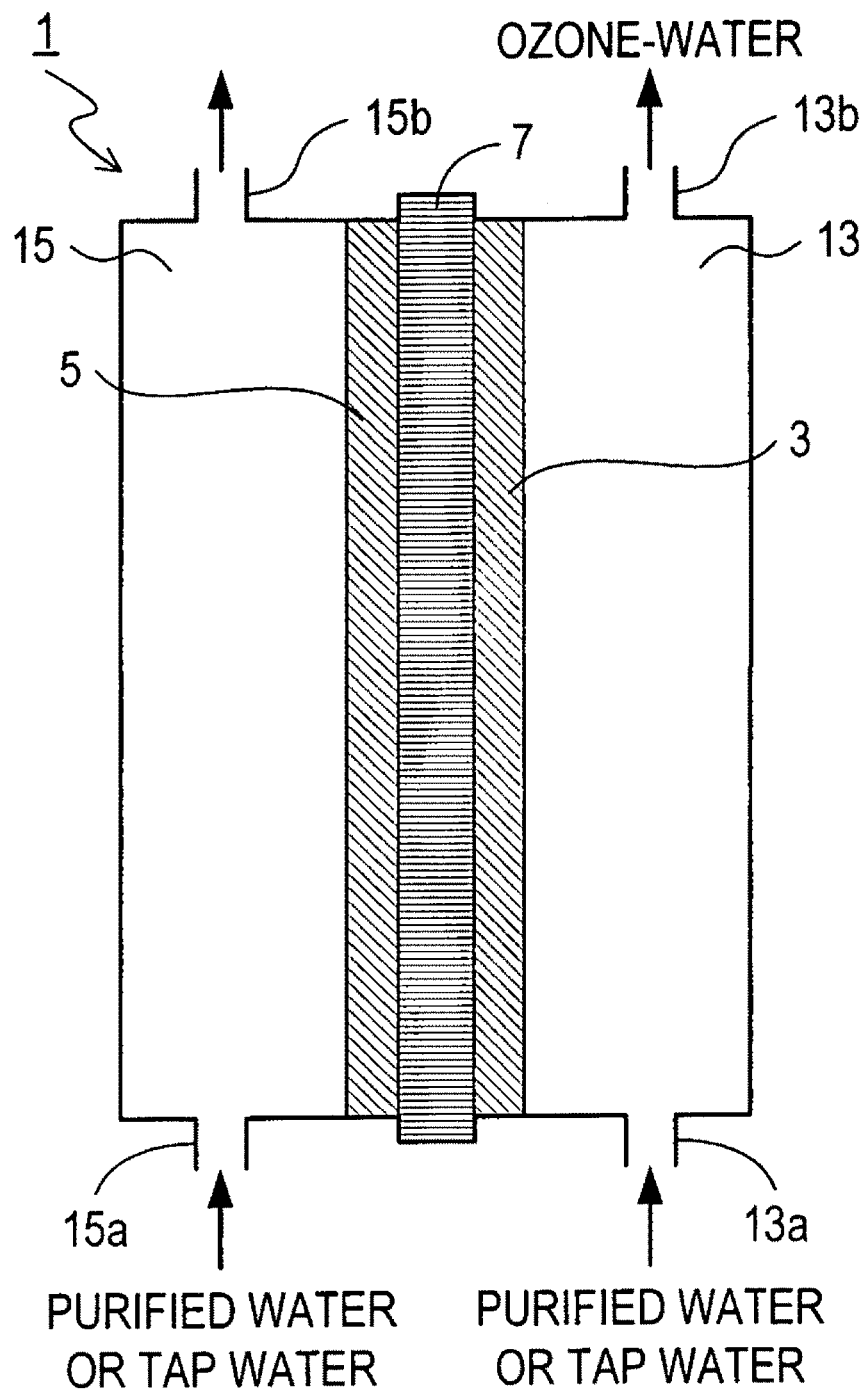
FIG. 12 is a diagram showing the structure of a conventional electrolysis cell.

A preferred embodiment of the present invention will now be described with reference to the accompanying drawings. FIG. 1 is a diagram showing the structure of an apparatus for producing ozone-water to which the present invention is applied. As shown in FIG. 1, the apparatus for producing ozone-water includes an electrolysis cell 1 configured in the same manner as the electrolysis cell 1 of the above-described conventional example except for the structure of an anode 3 to be described later. That is, as shown in FIG. 1, the anode 3 and a cathode 5 are disposed so as to interpose a solid polymer film 7 (for example, Product Name "Nafion": made by DuPont). The anode 3 and the cathode 5 are tightly attached and secured to the opposing surfaces of the solid polymer film 7. An anode chamber 13 and a cathode chamber 15 are respectively formed on the surfaces of the anode 3 and the cathode 5. The anode chamber 13 and the cathode chamber 15 respectively include supply ports 13a, 15a and outlet ports 13b, 15b. It is to be noted that, in FIG. 1 and FIG. 12, same referential numerals are given to the parts configured in the same manner, and detailed descriptions thereof are omitted.

Figure 2:
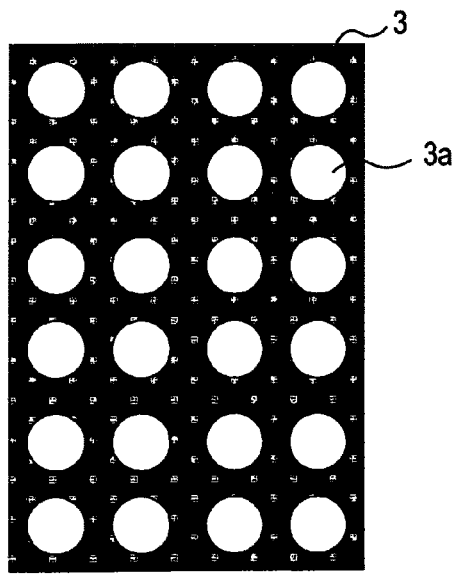
FIG. 2 is a diagram showing the structure of an anode of the apparatus for producing ozone-water.

As shown in FIG. 2, the anode 3 is a free-standing conductive diamond plate, which is formed in a rectangular plate shape with a thickness of 0.8 mm and a size of 15 mm×50 mm by a microwave plasma assisted CVD. The anode 3 is bored so as to be provided with holes 3a with a diameter of 1 mm. The center-distance between each of the holes 3a is 2 mm (that is, the distance between the outer peripherals of the holes 3a is 1 mm). The holes 3a can be bored by laser processing or electric discharging. For the cathode 5, a 55-mesh platinum electrode is used. In the electrolysis cell 1 configured as above, as purified water (tap water can be also used) is supplied through respective supply ports 13a and 15a while a direct electric current is applied between the anode 3 and the cathode 5, ozone-water is discharged from the outlet port 13b of the anode chamber 13.

Moreover, as shown in FIG. 1, the apparatus for producing ozone-water according to the present embodiment includes, as a heater, a temperature control unit 30 connected to the supply port 13a through an electromagnetic valve 20. The temperature control unit 30 is a known unit which heats supplied purified water or tap water to a predetermined temperature. Therefore, the apparatus for producing ozone-water according to the present embodiment can heat purified water or tap water to a predetermined temperature, and then supply the heated water to the anode chamber 13 so as to thereby produce ozone-water. The apparatus for producing ozone-water according to the present embodiment may be, if necessary, equipped with a deionizer, a flow volume sensor, an ozone-water concentration monitor, an ozone gas alarm, and so on.

Figure 4A:
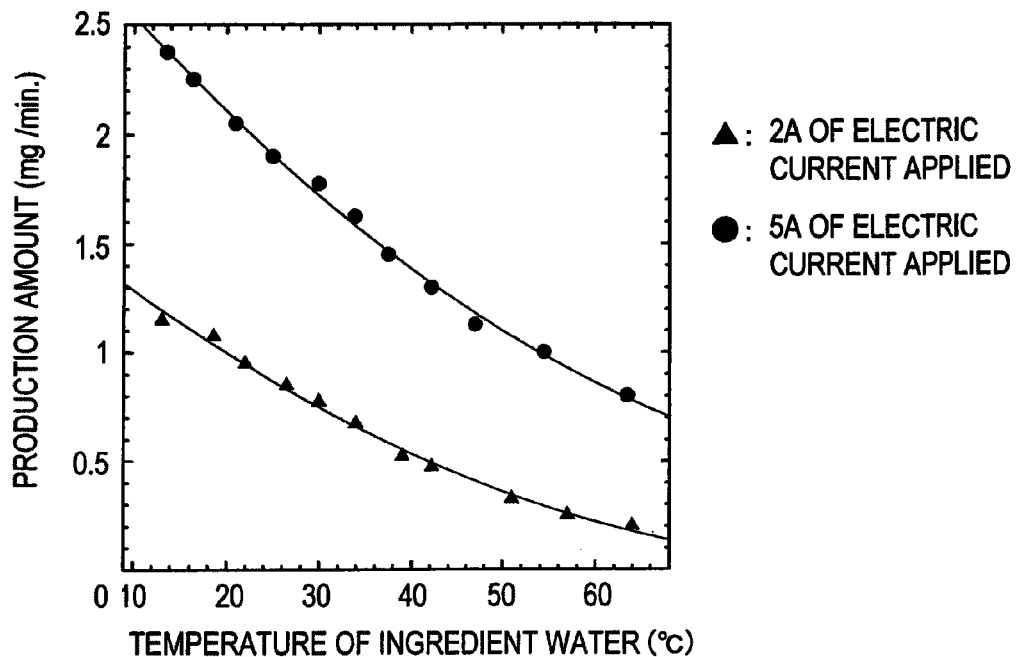
FIGS. 4A, 4B are graphs showing, in comparison with a comparative example, a dependency indicating that an amount of ozone produced by the above-described apparatus for producing ozone-water depends on water temperature when purified water is used as ingredient water.
Figure 4B:
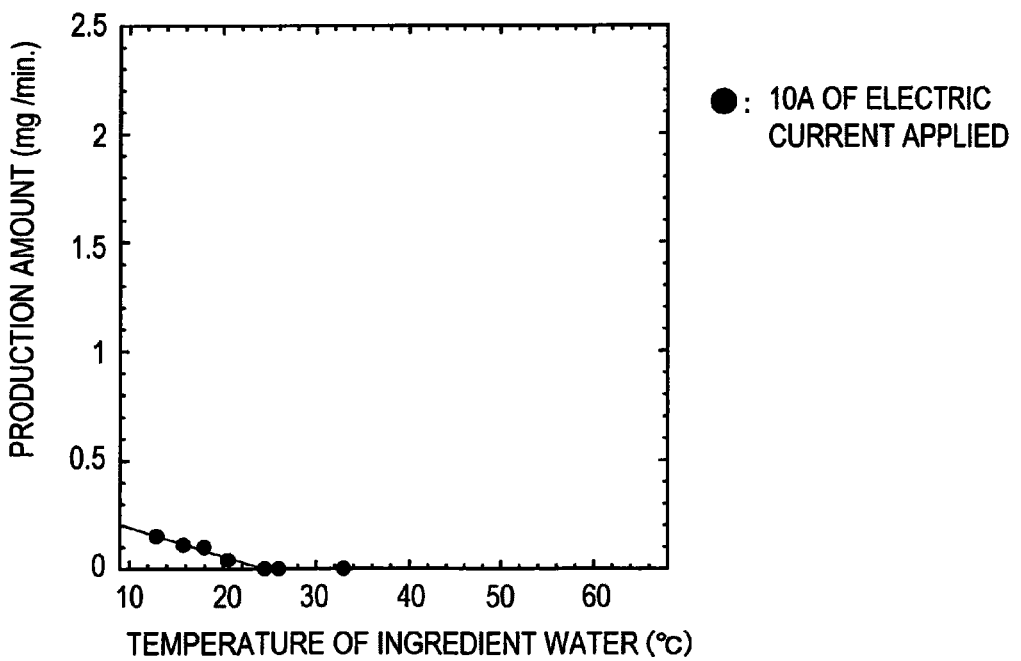

Subsequently, a comparison was made with respect to the amount of ozone produced by the apparatus for producing ozone-water according to the present embodiment (to be also referred to as a present example) and the amount of ozone produced in a comparative example wherein a platinum mesh electrode having a size of 15 mm×50 mm was used as the anode 3. FIGS. 3A and 3B are graphs showing the dependencies indicating that the amounts of ozone being produced depend on water temperature when tap water is used as ingredient water. FIG. 3A shows the dependency in the present example whereas FIG. 3B shows the dependency in the comparative example. FIGS. 4A and 4B are graphs showing the dependencies indicating that the amounts of ozone being produced depend on water temperature when purified water is used as ingredient water. FIG. 4A shows the dependency in the present example whereas FIG. 4B shows the dependency in the comparative example. Each of the graphs shows the result of measurement in which purified water or tap water was supplied 0.5 L per minute from the supply port 13a. The ozone production amount was evaluated by measuring the concentration of ozone-water by an ozone-water concentration meter (UV method).

As shown in FIG. 3A, it was found out that, in a case wherein a conductive diamond was used as the anode 3, ozone could be suitably produced even in an intermediate to high temperature range between 25-70° C. Therefore, in the present example, ozone-water of an intermediate to high temperature can be efficiently produced. On the other hand, as shown in FIG. 3B, it was found out that, in the comparative example, the ozone production amount significantly dropped as water temperature increased, and that ozone-water particularly at 40° C. or higher could hardly be produced.

Moreover, as shown in FIG. 4A, ozone-water of an intermediate to high temperature could be efficiently produced in the present example, even when purified water was used as ingredient water. On the other hand, as shown in FIG. 4B, ozone-water could be hardly produced in the comparative example, when purified water was used as ingredient water. Therefore, when purified water is used as ingredient water, the effect of using a conductive diamond as the anode 3 is more prominently shown. Although some of the reasons for this are not clear, it is presumed that the effectiveness might have something to do with the fact that chlorine ions, existing in tap water, are not contained in purified water.

Furthermore, it was found out that, when a conductive diamond was used as the anode 3, the wearing of the electrode was extremely small as compared to cases with platinum and the like. Therefore, in the present embodiment, ozone-water of an intermediate to high temperature can be stably and efficiently produced over a long period of time. The ozone-water of an intermediate to high temperature produced as described above can be used for disinfection/decontamination of an entire body by an ozone shower, when, for example, an infectious disease breaks out or an attack of bioterrorism takes place. Such ozone shower is expected to be effective also for treating atopy, skin diseases, decubitus and so on. Although ozone-water of an intermediate to high temperature, in which purified water is used as ingredient water, was not previously available, such ozone-water is expected to be used in a new way as cleaning water in semiconductor/electronic industries.

It is to be noted that the present invention is not limited to the above-described embodiment, and can be carried out in various ways without departing from the scope of the present invention. For example, as well as the anode 3, the cathode 5 may be made of a free-standing conductive diamond having a porous structure. Moreover, the holes 3a may be formed into other shapes. The holes 3a may be configured in a slit-like manner, or large holes 3a may be provided so that the anode 3 is formed into a mesh-like manner.

Although a free-standing conductive diamond is used as the anode 3 in the above-described embodiment, a substrate having a film of a conductive diamond formed thereon by a Hot Filament Chemical Vapor Deposition (CVD) or by a microwave plasma assisted CVD may be used as the anode 3, and the synthesizing method is not limited to the above-described method. In this case, although silicon, titanium, niobium, molybdenum and carbon are generally used as the substrate, the substrate material is not limited to these materials. Moreover, a free-standing conductive diamond film, obtained by depositing conductive diamond films on a substrate so as to form a thick film and then by removing the substrate therefrom, may be used as the anode 3 as described above. In this case, if a mesh substrate or a porous substrate is used, a porous anode 3 can be obtained without boring holes 3a as described above.

In case of producing ozone by using the above-described anode 3, due to the following reason, the thickness of the anode 3 is preferably 0.2-1.0 mm (more preferably 0.4-0.8 mm). That is, when a direct electric current is applied between the anode 3 and the cathode 5 of the electrolysis cell 1, on the inner-wall surfaces of the holes 3a, oxygen evolution reaction or ozone evolution reaction takes place due to oxidative decomposition of water.

$$2H_2O \rightarrow O_2 + 4H^+ + 4e- \quad (1)$$

$$3H_2O \rightarrow O_3 + 6H^+ + 6e- \quad (2)$$

Hydrogen ions produced through the reaction processes (1) and (2) permeate the solid polymer film 7 which has ion-permeable property, and reach the cathode 5. On the cathode 5, reduction reaction occurs wherein the hydrogen ions, which permeate through the film 7, receive electrons.

$$2H^+ + 2e- \rightarrow H_2 \quad (3)$$

Produced hydrogen is dispersed into the cathode chamber 15. However, as shown in FIG. 5, the reactions (1) and (2) take place most effectively at the interface where three phases: the solid polymer film 7 inside of the holes 3a; the inner-wall surfaces of the holes 3a; and the electrolysis liquid (water) inside of the anode chamber 13 contact with one another. This is because the travel distance of hydrogen ions becomes the shortest when the reactions take place in this area. Manufacturing a thick conductive diamond plate requires time and cost for the film formation. Therefore, a conductive diamond plate with an unnecessarily large thickness is not preferable to be employed as the anode 3. The thickness of the anode 3 is preferably equal to or smaller than 1.0 mm (more preferably, equal to or smaller than 0.8 mm).

When the above-described reactions (1) and (2) take place, gas bubbles B containing ozone and oxygen are produced at the above-described three-phase interface. Each of the gas bubbles B grows, as sequentially shown in FIG. 6A→FIG. 6B→FIG. 6C, as electrolysis proceeds. When the size of the gas bubble B becomes equal to or larger than a certain size, due to the buoyancy of the gas bubble B, the gas bubble B goes out of the hole 3a. Since the gas bubbles B interrupt the electrode reaction while being inside of the holes 3a, a larger electric voltage is necessary in order to further proceed the electrolysis. Therefore, if efficient ozone production is expected with a small electric power, the electrode is preferably configured such that the produced gas bubbles B can be efficiently removed. The degree of easiness for the gas bubbles B to be removed is closely related to the thickness of the anode 3. In consideration also of this point, the thickness of the anode 3 is preferably equal to or smaller than 1.0 mm (more preferably, equal to or smaller than 0.8 mm). However, if the above-described anode 3 is too thin, sufficient mechanical strength cannot be obtained. Therefore, the thickness of the anode 3 is preferably equal to or larger than 0.2 mm (more preferably, equal to or larger than 0.4 mm).

The degree of easiness for the gas bubbles B to be removed is also closely related to the diameter of the holes 3a. If the above-described diameter is smaller than 0.5 mm, the gas bubbles B become extremely hard to be removed. On the other hand, if the diameter of the holes 3a is too large, for example, equal to or larger than 3.0 mm, the above-described three-phase interface formed in a unit area becomes small, and the area where the reactions (1) and (2) take place becomes relatively small. Therefore, the diameter of the holes 3a is preferably 0.5-3.0 mm (more preferably, 1.0-2.0 mm). In this case, ozone can be highly efficiently produced.

Furthermore, in case a plurality of holes 3a are provided as described in the above embodiment, the interval between the outer peripherals of the holes 3a is preferably 0.2-1.5 mm. From the perspective to increase the above-described three-phase interface, the number of the holes 3a is the larger the better. However, if the interval between the outer peripherals of the holes 3a is too narrow, for example, smaller than 0.2 mm, sufficient strength cannot be provided to the anode 3. Therefore, the above-described interval is preferably 0.2-1.5 mm (more preferably, 0.4-0.8 mm). In this case, ozone can be efficiently produced while the mechanical strength of the anode 3 is sufficiently maintained.

Figure 7:
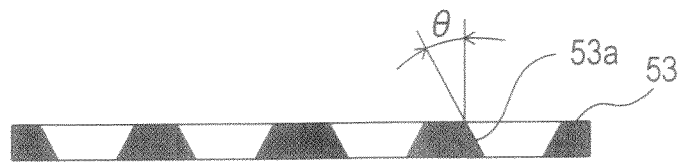
FIG. 7 is a diagram showing an example wherein taper machining is provided to the hole of the anode.

In order for the gas bubbles B to be easily removed, as shown in an anode 53 in FIG. 7, providing taper machining on the inner-wall surfaces of holes 53a such that the holes 53a become broadened from the side of the solid polymer film 7 toward outside (so-called a funnel-shape) may be effective.

Figure 8A:
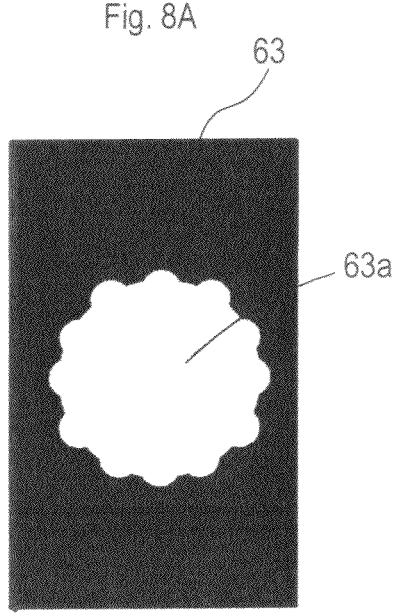
FIG. 8A, 8B are diagrams showing variations wherein the shape of the hole of the anode is changed.
Figure 8B:
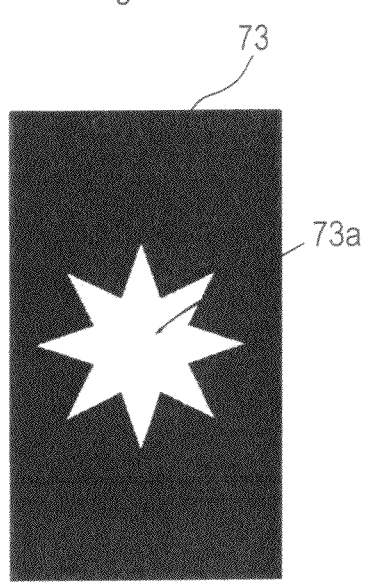

The three-phase interface may be also effectively increased, as shown in the partially enlarged anode 63 in FIG. 8A, by configuring the peripherals of the holes 63a corrugated, or as shown in a partially enlarged anode 73 in FIG. 8B, by forming holes 73a into a star-shape.

Figure 9A:
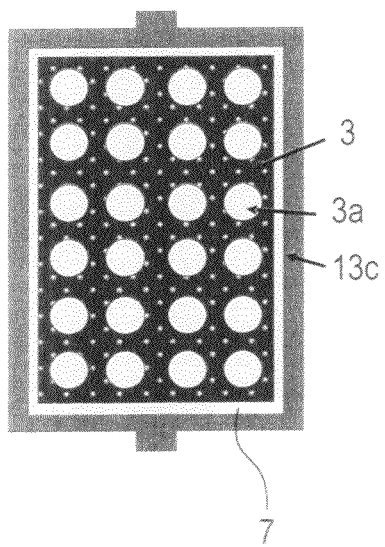
FIG. 9A, 9B are diagrams showing examples wherein a peripheral of the anode is separated from an outer peripheral portion of an anode chamber.
Figure 9B:
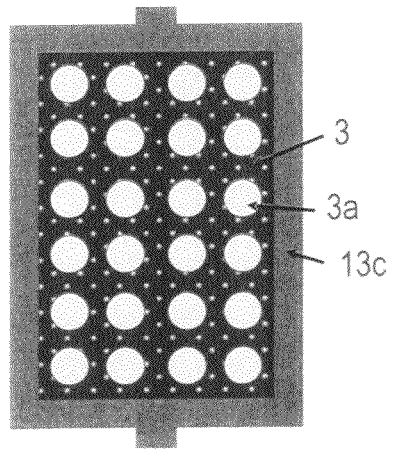

Furthermore, the three-phase interface can be also effectively increased, as shown in FIG. 9A, by configuring the anode 3 smaller than the solid polymer film 7, separating the peripheral of the anode 3 from the outer peripheral portion 13c of the anode chamber 13, and thereby forming the three-phase interface in the peripheral of the anode 3. In other words, as shown in FIG. 9B, the sizes of the solid polymer film 7 and the anode 3, disposed inside of the outer peripheral portion 13c, are normally the same, or the peripheral of the anode 3 is sealed by a sealing member such that the state of the solid polymer film 7 and the anode 3 is substantially in the same manner as in FIG. 9B. However, by forming the three-phase interface around the anode 3 as in FIG. 9A, the efficiency in producing ozone can be suitably improved.

Figure 10:
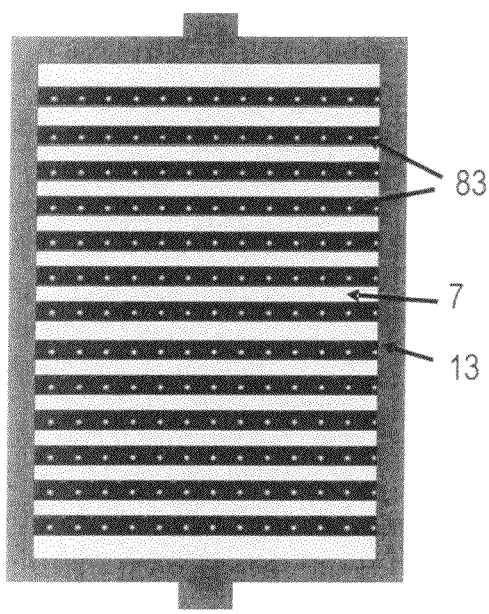
FIG. 10 is a diagram showing a variation wherein columnar diamonds are used as the anode.
Figure 11:
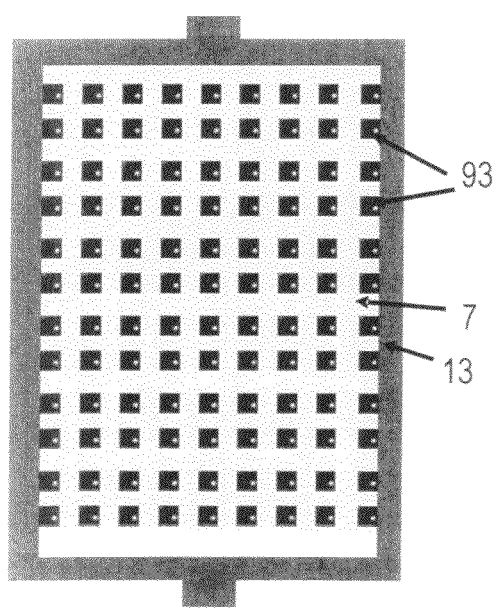
FIG. 11 is a diagram showing a variation wherein fragmentary diamonds are used as the anode.

Still furthermore, in order to increase the three-phase interface, as shown in FIG. 10, a number of columnar (in this case, square columnar) anodes 83, made of free-standing conductive diamonds, may be disposed in parallel to the surface of the solid polymer film 7. Alternatively, as shown in FIG. 11, a number of fragmentary (in this case, cubical) anodes 93, made of free-standing conductive diamonds, may be disposed on the surface of the solid polymer film 7. Also in these cases, the three-phase interface can be increased, and the efficiency in producing ozone can be improved.

What is claimed is:

1. A method for producing ozone-water comprising steps of:
   providing a cathode and an anode so as to interpose a solid polymer film therebetween; and
   electrolyzing water,
   wherein a free-standing conductive diamond plate having regularly arranged porosities, is used as the anode,
   wherein ozone-water of an intermediate to high temperature is produced by electrolyzing water of an intermediate to high temperature; and
   wherein the regularly arranged porosities are formed by regularly arranged holes wherein the inner-wall surfaces of the holes are formed to be tapered so that the holes become broadened from the side of the solid polymer film toward the side opposite to the solid polymer film.

2. An apparatus for producing ozone-water by electrolyzing water comprising:
   an electrolysis cell including:
   a cathode;
   an anode; and
   a solid polymer film interposed between the cathode and the anode; and
   a heater that heats water to be supplied at least toward the anode of the electrolysis cell to an intermediate to high temperature,
   wherein a free-standing conductive diamond plate having regularly arranged porosities, is used as the anode; and
   wherein the regularly arranged porosities are formed by regularly arranged holes wherein the inner-wall surfaces of the holes are formed to be tapered so that the holes become broadened from the side of the solid polymer film toward the side opposite to the solid polymer film.

3. The method for producing ozone-water according to claim 1 wherein the tapered holes are formed by laser processing or electrical discharging.

4. The method for producing ozone-water according to claim 1 wherein the free-standing conductive diamond plate is formed by arranging parallel a plurality of columnar free-standing conductive diamonds.

5. The method for producing ozone-water according to claim 1 wherein the free-standing conductive diamond plate is formed by regularly arranging a plurality of cubical free-standing conductive diamonds.

6. The method for producing ozone-water according to claim 1 wherein the free-standing conductive diamond plate has slit-like holes.

7. The method for producing ozone-water according to claim 1 wherein the free-standing conductive diamond plate has mesh-like holes.

8. The apparatus for producing ozone-water according to claim 2 wherein the holes are formed by laser processing or electrical discharging.

9. The apparatus for producing ozone-water according to claim 2 wherein the free-standing conductive diamond plate is formed by arranging parallel a plurality of columnar free-standing conductive diamonds.

10. The apparatus for producing ozone-water according to claim 5 wherein the free-standing conductive diamond plate is formed by regularly arranging a plurality of cubical free-standing conductive diamonds.

11. The apparatus for producing ozone-water according to claim 2 wherein the free-standing conductive diamond plate has slit-like holes.

12. The apparatus for producing ozone-water according to claim 2 wherein the free-standing conductive diamond plate has mesh-like holes.

13. A method for producing ozone-water comprising steps of:
   providing a cathode and an anode so as to interpose a solid polymer film therebetween; and
   electrolyzing water,
   wherein a free-standing conductive diamond plate having regularly arranged holes is used as the anode,
   wherein ozone-water of an intermediate to high temperature is produced by electrolyzing water of an intermediate to high temperature, and
   wherein the free-standing conductive diamond plate is formed by regularly arranging a plurality of cubical free-standing conductive diamonds; and
   wherein inner-wall surfaces of the holes formed are formed to be tapered so that the holes become broadened from the side of the solid polymer film toward the side opposite to the solid polymer film.

14. The method for producing ozone-water according to claim 13 wherein the holes are formed by laser processing or electrical discharging.

15. An apparatus for producing ozone-water by electrolyzing water comprising:
   an electrolysis cell including:
   a cathode;
   an anode; and
   a solid polymer film interposed between the cathode and the anode; and
   a heater that heats water to be supplied at least toward the anode of the electrolysis cell to an intermediate to high temperature,
   wherein a free-standing conductive diamond plate having regularly arranged holes is used as the anode, and
   wherein the free-standing conductive diamond plate is formed by regularly arranging a plurality of cubical free-standing conductive diamonds; and
   wherein inner-wall surfaces of the holes formed are formed to be tapered so that the holes become broadened from the side of the solid polymer film toward the side opposite to the solid polymer film.

16. The apparatus for producing ozone-water according to claim 15 wherein the holes are formed by laser processing or electrical discharging.

* * * * *